(12) United States Patent
Kobayashi et al.

(10) Patent No.: US 11,502,382 B2
(45) Date of Patent: Nov. 15, 2022

(54) NONAQUEOUS ELECTROLYTE SECONDARY BATTERY

(71) Applicant: SANYO Electric Co., Ltd., Daito (JP)

(72) Inventors: Kei Kobayashi, Osaka (JP); Atsushi Mizawa, Hyogo (JP); Takaki Nakao, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 95 days.

(21) Appl. No.: 16/982,676

(22) PCT Filed: Feb. 15, 2019

(86) PCT No.: PCT/JP2019/005594
§ 371 (c)(1),
(2) Date: Sep. 21, 2020

(87) PCT Pub. No.: WO2019/187755
PCT Pub. Date: Oct. 3, 2019

(65) Prior Publication Data
US 2021/0005871 A1    Jan. 7, 2021

(30) Foreign Application Priority Data
Mar. 27, 2018    (JP) .............................. JP2018-060677

(51) Int. Cl.
*H01M 50/572*    (2021.01)
*H01M 50/595*    (2021.01)
(Continued)

(52) U.S. Cl.
CPC ..... *H01M 50/572* (2021.01); *H01M 10/0587* (2013.01); *H01M 50/595* (2021.01); *H01M 10/0525* (2013.01)

(58) Field of Classification Search
CPC .... H01M 50/10; H01M 50/20; H01M 50/545; H01M 10/04; H01M 10/0587
See application file for complete search history.

(56) References Cited

U.S. PATENT DOCUMENTS 9,502,733 B2 *    11/2016    Son ................... H01M 10/0431
2005/0221173 A1    10/2005    Tatebayashi et al.
(Continued)

FOREIGN PATENT DOCUMENTS

| JP | 9-161814 A | 6/1997 |
| JP | 2006-302801 A | 11/2006 |
| JP | 2013-254561 A | 12/2013 |

OTHER PUBLICATIONS

Machine Translation of: JP 2006/302801, Minetani, Nov. 2, 2006.*
(Continued)

*Primary Examiner* — Kenneth J Douyette
(74) *Attorney, Agent, or Firm* — WHDA, LLP (57) ABSTRACT

The purpose of the present disclosure is to prevent, in a nonaqueous electrolyte secondary battery, a tape adhered to an outermost peripheral surface of an electrode group from breaking due to charging and discharging. A nonaqueous electrolyte secondary battery according to one embodiment of the present disclosure includes a winding-type electrode group and tapes adhered to an outermost peripheral surface of the electrode group so that an electrode group winding end E is fixed to the outermost peripheral surface of the electrode group. The tapes include: two adhesive regions including a substrate layer and an adhesive layer; and a non-adhesive region sandwiched between the two adhesive regions and consisting only of the substrate layer. The non-adhesive region is disposed so as to extend across the winding end E, which is positioned on the outermost periphery of the electrode group, in the winding direction.

2 Claims, 6 Drawing Sheets

(51) Int. Cl.
   *H01M 10/0587*   (2010.01)
   *H01M 10/0525*   (2010.01)

(56) References Cited

U.S. PATENT DOCUMENTS

| | | | |
|---|---|---|---|
| 2008/0102354 A1* | 5/2008 | Lee .................. | H01M 10/0481 |
| | | | 429/94 |
| 2010/0035132 A1* | 2/2010 | Park ..................... | H01M 50/60 |
| | | | 429/94 |
| 2017/0084958 A1 | 3/2017 | Ueda | |

OTHER PUBLICATIONS

International Search Report dated Apr. 23, 2019 issued in counterpart International Application No. PCT/JP2019/005594. (1 page).
Extended (Supplementary) European Search Report dated Apr. 19, 2021, issued in counterpart EP application No. 19776966.4. (7 pages).

* cited by examiner

NONAQUEOUS ELECTROLYTE SECONDARY BATTERY

TECHNICAL FIELD

The present disclosure relates to a non-aqueous electrolyte secondary battery.

BACKGROUND ART

There has been conventionally known a non-aqueous electrolyte secondary battery comprising an electrode group where a positive electrode and a negative electrode are wound with a separator interposed therebetween, and a battery case housing the electrode group and an electrolytic solution. The electrode group in the secondary battery is secured by attaching a tape onto the outermost peripheral surface of the electrode group.

The tape for use in the secondary battery is commonly one where an adhesion layer is formed on the entire surface of one surface of a resin film as a substrate layer of polypropylene or the like, from the viewpoints of strength, electrolytic solution resistance, processability, cost, and the like.

Patent Literature 1 describes a configuration obtained by configuring an electrode group such that a negative electrode current collector is disposed on the outermost periphery of a secondary battery, housing the electrode group in a battery case, and allowing the negative electrode current collector on the outermost periphery to be directly in contact and communication with the battery case. It is considered that the electrode group, when expanded, is increased in contact area between the electrode group and the battery case, as compared with when the electrode group is housed in the battery case. Thus, it is considered that an increase in current collection area can allow for a reduction in battery resistance.

CITATION LIST

Patent Literature

PATENT LITERATURE 1: Japanese Unexamined Patent Application Publication No. 2013-254561

SUMMARY

It is commonly known that electrode groups are expanded by repeating charge and discharge of secondary batteries. In the case of a wound electrode group, a winding finish end of the electrode group tries to move in the winding direction according to expansion of the electrode group. In such a case, a tape receives tensile stress along with the winding direction in a local range in the vicinity of the winding finish end of the electrode group, and thus the tape can be fractured. In particular, in a case where a negative electrode current collector is disposed on the outermost periphery of the electrode group, as described in Patent Literature 1, the problem is remarkably caused. If a tape attached on the outermost peripheral surface of the electrode group is fractured, a shape maintaining function of the electrode group with the tape is lost.

It is an advantage of the present disclosure is to inhibit a tape attached on the outermost peripheral surface of an electrode group from being fractured according to charge and discharge in a non-aqueous electrolyte secondary battery.

The non-aqueous electrolyte secondary battery according to the present disclosure is a non-aqueous electrolyte secondary battery comprising a bottomed cylindrical case body having an opening, an electrode group which is housed in the case body and in which a positive electrode plate and a negative electrode plate are wound with a separator interposed therebetween, and a tape attached on an outermost peripheral surface of the electrode group such that a winding finish end of the electrode group is secured to the outermost peripheral surface of the electrode group, wherein the tape has two adhesion regions each including a substrate layer and an adhesion layer, and a non-adhesion region which is sandwiched between the two adhesion regions and which consists only of a substrate layer, and the non-adhesion region is disposed in such a way as to extend across the winding finish end located on an outermost periphery of the electrode group, in a winding direction.

According to the non-aqueous electrolyte secondary battery according to the present disclosure, a non-adhesion region sandwiched between two adhesion regions of a tape is disposed in such a way as to extend across a winding finish end located on the outermost periphery of an electrode group. Thus, even if the winding finish end tries to move along with expansion of the electrode group, the tape does not receive any tensile stress from a local range in the vicinity of the winding finish end, but the tape receives tensile stress from the outermost peripheral surface of the electrode group with the adhesion regions away from each other being interposed. Thus, the tape receives tensile stress from positions away from each other, and therefore the tensile stress is absorbed by stretching of the tape to inhibit the tape from being fractured.

DESCRIPTION OF EMBODIMENTS

Hereinafter, embodiments according to the present invention will be described with reference to the accompanied drawings. In the following description, specific shapes, materials, numerical numbers, directions, and the like are illustrative for facilitating understanding of the present invention, and can be appropriately modified depending on the specification of the non-aqueous electrolyte secondary battery. Hereinafter, the term "substantially" is used to mean to include, for example, not only a completely same case, but also a case where it is believed to be substantially the same. Furthermore, in a case where a plurality of embodiments and modified examples are included, appropriate combination and use of such characteristic portions have been conceived from the beginning.

Figure 1:
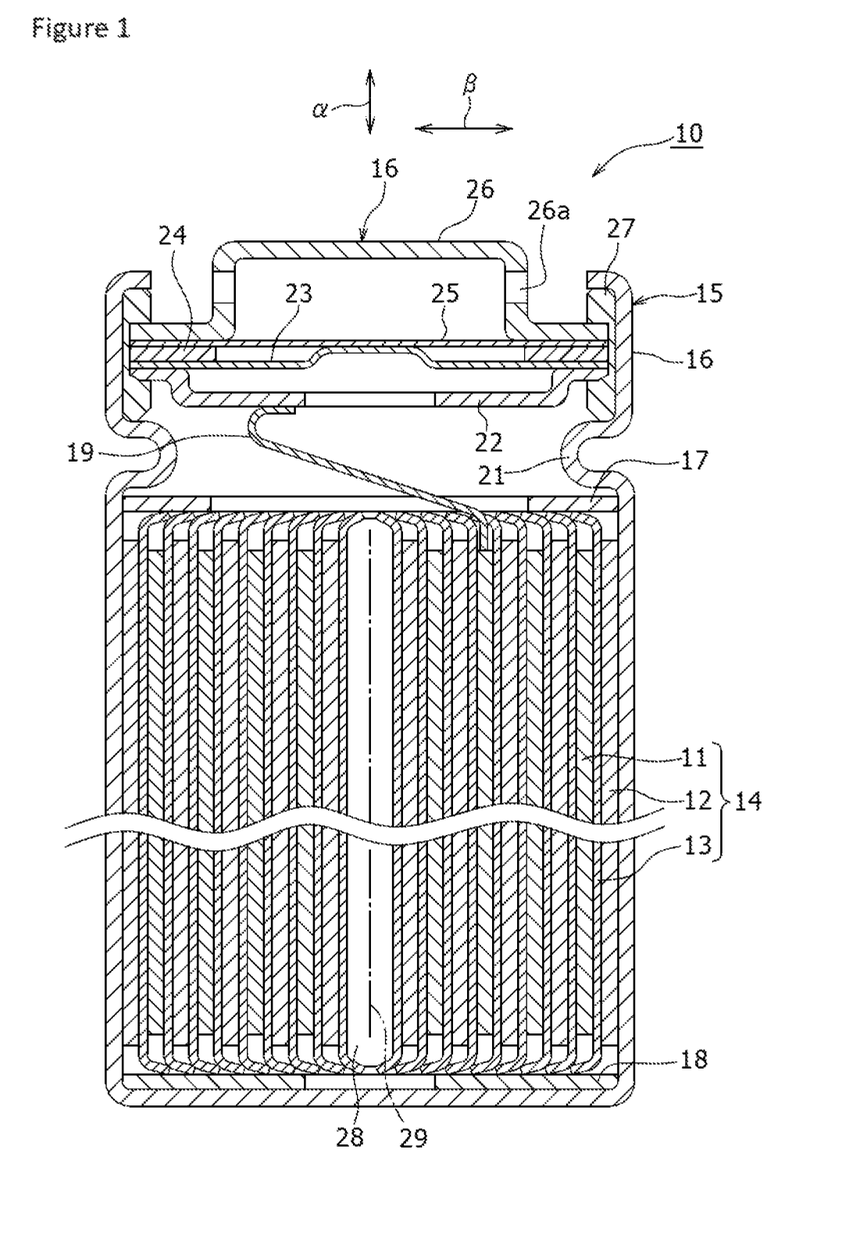
FIG. 1 is a sectional view of a non-aqueous electrolyte secondary battery as one example of an embodiment.
Figure 2:
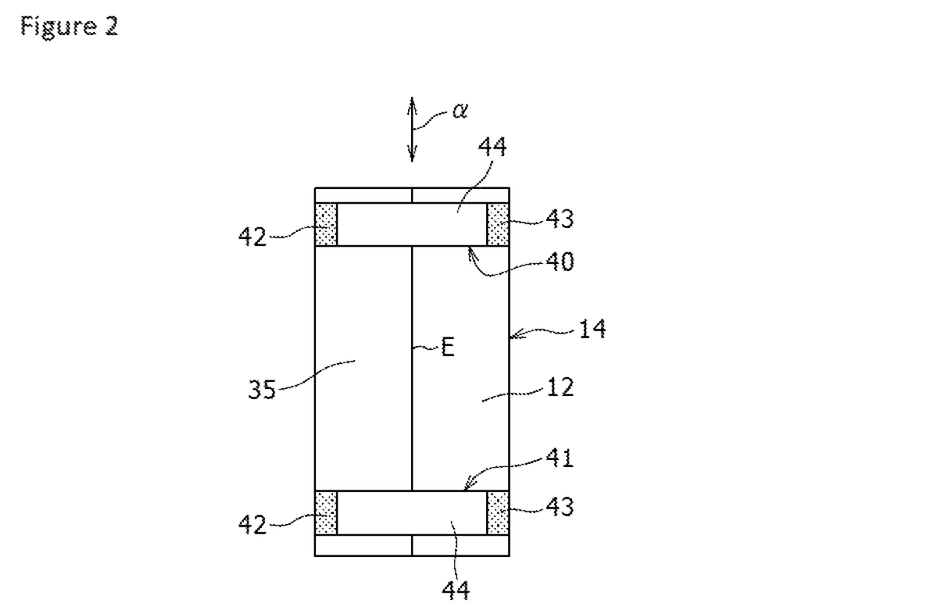
FIG. 2 is a view of an electrode group in one example of an embodiment, when viewed from the outer periphery.
Figure 3:
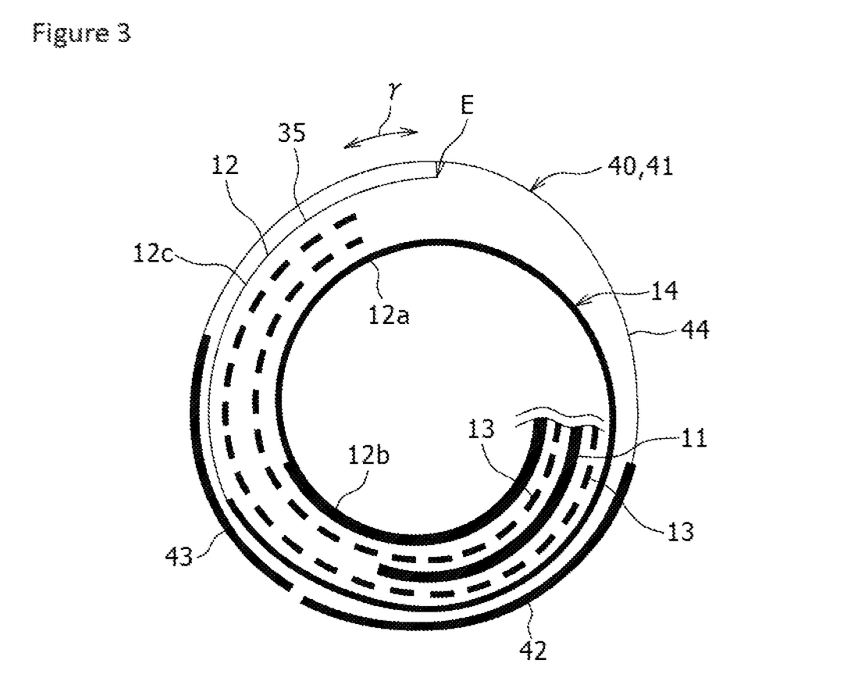
FIG. 3 is a sectional view perpendicular to an axial direction, of the outer periphery portion of an electrode group in one example of an embodiment.
Figure 4:
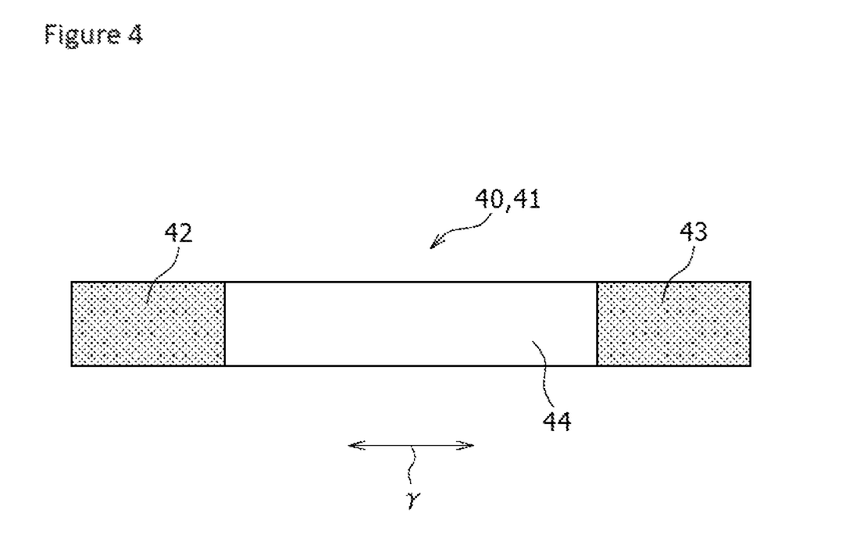
FIG. 4 is a view illustrating a spread state of a tape constituting a non-aqueous electrolyte secondary battery of one example of an embodiment.

FIG. 1 is a sectional view of a non-aqueous electrolyte secondary battery 10 of an embodiment. FIG. 2 is a view of an electrode group constituting the non-aqueous electrolyte secondary battery 10, when viewed from the outer periphery. FIG. 3 is a sectional view perpendicular to an axial direction, of the outer periphery portion of an electrode group in an embodiment. FIG. 4 is a view illustrating a spread state of each of tapes 40 and 41 constituting a non-aqueous electrolyte secondary battery 10 of an embodiment. As exemplified in FIG. 1 to FIG. 3, a non-aqueous electrolyte secondary battery 10 comprises a wound-type electrode group 14, two tapes 40 and 41 (FIG. 2 to FIG. 4) attached on the outermost peripheral surface of the electrode group 14, a non-aqueous electrolyte (not illustrated), a case body 15 and a sealing assembly 16. The wound-type electrode group 14 has a positive electrode plate 11, a negative electrode plate 12 and a separator 13, and the positive electrode plate 11 and the negative electrode plate 12 are spirally wound with the separator 13 interposed therebetween. Hereinafter, one end of the electrode group 14 in the axial direction may be referred to as "upper", and other end thereof in the axial direction may be referred to as "lower". The non-aqueous electrolyte includes a non-aqueous solvent and an electrolyte salt dissolved in the non-aqueous solvent. The non-aqueous electrolyte is not limited to a liquid electrolyte, and may be a solid electrolyte using a gel-like polymer or the like.

The positive electrode plate 11 has a belt-like positive electrode current collector and a positive electrode lead 19 (FIG. 1) bonded to the current collector. The positive electrode lead 19 is a conductive member for electrically connecting the positive electrode current collector and a positive electrode terminal, and extends out toward one end (upper end) in an axial direction α from an upper end of the positive electrode current collector of the electrode group 14. The positive electrode lead 19 is provided on, for example, a substantially center portion in a radial direction β of the electrode group 14. The positive electrode lead 19 is a belt-like conductive member. The constituent material of the positive electrode lead is not particularly limited. The positive electrode lead 19 is preferably constituted by a metal including aluminum as a main component.

The negative electrode plate 12 has a belt-like negative electrode current collector 35 (FIG. 3). The negative electrode current collector 35 is contacted with the inside surface of a cylindrical portion of a case body 15 described below, serving as a negative electrode terminal, and electrically connected to the case body 15, on the outermost peripheral surface of the electrode group 14 in the negative electrode plate 12. The case body 15 serves as a negative electrode terminal in the non-aqueous electrolyte secondary battery 10. Herein, a negative electrode lead (not illustrated) can also be connected to the negative electrode current collector in a state where the negative electrode current collector exposed to the outermost peripheral surface of the electrode group 14 is in contact with the inside surface of a cylindrical portion of the case body 15. In this case, a portion of the negative electrode lead, the portion being allowed to extend out more downward than the negative electrode current collector, is electrically connected to a bottom plate of the case body 15. The negative electrode lead is a belt-like conductive member. The constituent material of the negative electrode lead is not particularly limited. The negative electrode lead is preferably constituted by a metal including nickel or copper as a main component, or a metal including both nickel and copper.

The electrode group 14 has, as described above, a winding structure obtained by spirally winding the positive electrode plate 11 and the negative electrode plate 12 with the separator 13 interposed therebetween. The positive electrode plate 11, the negative electrode plate 12 and the separator 13 are each formed in a belt shape and are spirally wound, and thus is in a state of being alternately stacked in a radial direction β of the electrode group 14. The longitudinal direction of each of the electrodes corresponds to a winding direction γ (FIG. 3) and the width direction of each of the electrodes corresponds to the axial direction α (FIG. 2), in the electrode group 14. In the present embodiment, a space 28 is formed in a winding core portion including a winding core of the electrode group 14. The electrode group 14 is spirally wound around a winding center axis 29 elongating in the axial direction, at the center of the space 28. The winding center axis 29 is here a center axis elongating in the axial direction, at the center position in the diameter direction of the space 28, and serves as the winding core of the electrode group 14.

As illustrated in FIG. 2 and FIG. 3, the two tapes 40 and 41 are respective winding stop tapes attached on the outermost peripheral surfaces at both end portions in the axial direction α of the electrode group 14 so as to secure a winding finish end E of the electrode group 14 onto the outermost peripheral surface of the electrode group 14. The tapes 40 and 41 are each attached on the outermost peripheral surface of the negative electrode plate 12 so as to extend across a winding finish end E of the negative electrode plate 12 located on the outermost periphery of the electrode group 14, in the winding direction. A non-adhesion region 44 of each of the tapes 40 and 41 is disposed in such a way as to extend across a winding finish end E of the negative electrode plate 12, in the winding direction γ, the winding finish end E being located on the outermost periphery of the electrode group 14. Thus, the tapes 40 and 41 can be inhibited from being fractured according to charge and discharge. The tapes 40 and 41 are described below in detail.

The case body 15 and the sealing assembly 16 constitute a metallic battery case that houses the electrode group 14 and a non-aqueous electrolyte, in an example illustrated in FIG. 1. Insulating plates 17 and 18 are provided above and below the electrode group 14, respectively. The positive electrode lead 19 extends toward the sealing assembly 16 though a through-hole in the insulating plate 17 located above, and is welded to a lower surface of a filter 22 as a bottom plate of the sealing assembly 16. A cap 26 as a top panel of the sealing assembly 16 electrically connected to the filter 22 serves as a positive electrode terminal in the non-aqueous electrolyte secondary battery 10.

The case body 15 is a bottomed cylindrical, for example, bottomed circular cylindrical metallic container having an opening. A gasket 27 is provided between the case body 15 and the sealing assembly 16, and sealability in the battery case is ensured. The case body 15 has a projecting portion 21 which is formed by, for example, pressing a side surface portion from outside and which supports the sealing assembly 16. The projecting portion 21 is preferably formed annularly along with the circumferential direction of the case body 15, and supports the sealing assembly 16 by the upper surface thereof. The sealing assembly 16 seals the opening in the case body 15.

The sealing assembly 16 has the filter 22, a lower vent member 23, an insulating member 24, an upper vent member 25 and the cap 26 that are stacked closer to the electrode group 14 in the listed order. Such members constituting the sealing assembly 16 each have, for example, a disc shape or a ring shape, and such members except for the insulating member 24 are electrically connected to one another. The lower vent member 23 and the upper vent member 25 are connected to each other at the respective center portions thereof, and the insulating member 24 is interposed between respective peripheral edge portions. If the internal pressure of the battery is increased by abnormal heat generation, for example, the lower vent member 23 is fractured, thereby causing the upper vent member 25 to be swollen toward the cap 26 and to be separated from the lower vent member 23, thereby blocking electrical connection between both the members. If the internal pressure is further increased, the upper vent member 25 is fractured, causing any gas to be emitted through an opening 26a in the cap 26.

Hereinafter, the electrode group 14 and the tapes 40 and 41 will be described in detail with reference to FIG. 2 to FIG. 4. The negative electrode plate 12 is formed larger than the positive electrode plate 11 in the electrode group 14 in order to prevent precipitation of lithium on the negative electrode plate 12. Specifically, the width of the negative electrode plate 12 in the axial direction α is more than that of the positive electrode plate 11 (FIG. 1). The length of the negative electrode plate 12 in the longitudinal direction in the winding direction γ is more than that of the positive electrode plate 11 in the longitudinal direction. Thus, at least a portion of the positive electrode plate 11, where a positive electrode active material layer is formed on the portion, is oppositely disposed to a portion of the negative electrode plate 12, where a negative electrode active material layer is formed on the portion, with the separator 13 interposed therebetween in the electrode group 14. As illustrated in FIG. 3, the negative electrode plate 12 includes a single-sided active material region 12a illustrated by a moderately thick line, a two-sided active material region 12b illustrated by a line thicker than the moderately thick line and a plain region 12c illustrated by a line thinner than the moderately thick line. In the two-sided active material region 12b, a negative electrode active material layer is formed on each of both inside and outside surfaces of the negative electrode current collector 35. In the single-sided active material region 12a, a negative electrode active material layer is formed on only an inside surface located closer to the winding core of the negative electrode current collector 35. In the plain region 12c, no negative electrode active material layer is formed on both inside and outside surfaces of the negative electrode current collector 35. FIG. 3 illustrates two separators 13 by dashed lines.

The positive electrode plate 11 has a belt-like positive electrode current collector and a positive electrode active material layer formed on the positive electrode current collector. In the present embodiment, a positive electrode active material layer is formed on each of both surfaces of the positive electrode current collector. The positive electrode current collector here used is, for example, foil of a metal such as aluminum or a film where such a metal is disposed on a front surface. A suitable positive electrode current collector is foil of a metal including aluminum or an aluminum alloy as a main component. The thickness of the positive electrode current collector is, for example, 10 µm to 30 µm.

The positive electrode active material layer preferably includes a positive electrode active material, a conductive agent and a binder. The positive electrode plate 11 is produced by, for example, coating both surfaces of the positive electrode current collector with a positive electrode mixture slurry including a positive electrode active material, a conductive agent, a binder and a solvent such as N-methyl-2-pyrrolidone (NMP), and then drying and rolling the resultant.

Examples of the positive electrode active material can include a lithium-containing transition metal oxide containing a transition metal element such as Co, Mn and/or Ni. The lithium-containing transition metal oxide is not particularly limited, and is preferably a composite oxide represented by general formula $Li_{1+x}MO_2$ (wherein $-0.2 < x \leq 0.2$ is satisfied and M includes at least one of the group consisting of Ni, Co, Mn and Al).

Examples of the conductive agent include carbon materials such as carbon black (CB), acetylene black (AB), Ketjen black and graphite. Examples of the binder include a fluororesin such as polytetrafluoroethylene (PTFE) and polyvinylidene fluoride (PVdF), polyacrylonitrile (PAN), polyimide (PI), an acrylic resin, and a polyolefin-based resin. Such a resin may be used in combination with carboxymethylcellulose (CMC) or a salt thereof, polyethylene oxide (PEO), or the like. These may be used singly or in combinations of two or more thereof.

A plain portion (not illustrated) on which the surface of a metal constituting a positive electrode current collector 30 is exposed is provided on the positive electrode plate 11. The plain portion is a portion to which the positive electrode lead 19 is connected and in which the surface of the positive electrode current collector 30 is not covered with the positive electrode active material layer. The plain portion is formed wider than the positive electrode lead 19. The plain portion is suitably provided on each of both surfaces of the positive electrode plate 11 so as to be overlapped with the positive electrode plate 11 in the thickness direction. The positive electrode lead 19 is bonded to the plain portion by, for example, ultrasonic welding.

The negative electrode plate 12 has a belt-like negative electrode current collector 35 and a negative electrode active material layer formed on the negative electrode current collector 35. In the present embodiment, while a negative electrode active material layer is formed on each of both surfaces of the negative electrode current collector 35, a single-sided active material region 12a where a negative electrode active material layer is formed on only an inside surface of the negative electrode current collector 35 is continued to a winding stop end of a two-sided active material region 12b where a negative electrode active material layer is formed on both surfaces of the negative electrode current collector 35, as illustrated in FIG. 3. A combined portion of a plain region 12c and the single-sided active material region 12a in the negative electrode plate 12 has a length corresponding to one cycle or more. The negative electrode current collector 35 here used is, for example, foil of a metal such as copper or a film where such a metal is disposed on a front surface. The thickness of the negative electrode current collector 35 is, for example, 5 µm to 30 µm.

The negative electrode active material layer preferably includes a negative electrode active material and a binder. The negative electrode plate 12 is produced by, for example, coating both surfaces of the negative electrode current collector 35 with a negative electrode mixture slurry including a negative electrode active material, a binder, water, and the like, and then drying and rolling the resultant.

The negative electrode active material is not particularly limited as long as such a material can reversibly occlude and release lithium ions, and, for example, a carbon material such as natural graphite or artificial graphite, any metal to be alloyed with lithium, such as Si or Sn, or an alloy including such a metal, or a composite oxide can be used. For example, the same resin as in the case of the positive electrode plate 11 is used for the binder included in the negative electrode active material layer. In a case where the negative electrode mixture slurry is prepared by an aqueous solvent, styrene-butadiene rubber (SBR), CMC or a salt thereof, polyacrylic acid or a salt thereof, polyvinyl alcohol, or the like can be used. These may be used singly or in combinations of two or more thereof.

As illustrated in FIG. 3, the winding finish end portion of the negative electrode plate 12 more extends in the winding direction γ, than the winding finish end portion of each of the separators 13. The negative electrode current collector 35 is exposed on the entire surface of the outermost periphery of the electrode group 14. The outermost peripheral surface of the electrode group 14 on which the negative electrode current collector 35 is exposed is contacted with the inside surface of the cylindrical portion of the case body 15, and electrically connected to the cylindrical portion.

A porous sheet having ion permeability and insulating properties is used for each of the separators 13. Specific examples of the porous sheet include a microporous thin film, a woven cloth and an unwoven cloth. The material of each of the separators 13 is preferably an olefin resin such as polyethylene or polypropylene. The thickness of each of the separator 13 is, for example, 10 μm to 50 μm. The separators 13 tend to be thinned according to an increase in capacity and an increase in output of the battery. The separators 13 each have, for example, a melting point of about 130° C. to 180° C.

As illustrated in FIG. 2 and FIG. 3, the two tapes 40 and 41 are attached on both end portions in the axial direction of the outermost peripheral surface of the negative electrode plate 12 so as to secure the winding finish end E of the negative electrode plate 12 to the outermost peripheral surface of the negative electrode plate 12, as the outermost peripheral surface of the electrode group 14. The tapes 40 and 41 are each, for example, made of an insulating material such as a PP tape. The PP tape is one where an adhesion layer is formed on one surface of a porous or non-porous substrate layer made of polypropylene (PP). The substrate layer of each of the tapes 40 and 41 may be appropriately selected from the viewpoints of strength, electrolytic solution resistance, processability, cost, and the like, and is not limited to polypropylene, and polyimide (PI), polyethylene terephthalate (PET) or the like can also be used. The substrate layer can also be a stacked structure, and, for example, a heat-resistant layer where inorganic particles of a metal oxide or the like are dispersed in an organic material can be used for a portion of the substrate layer. The adhesion layer of each of the tapes is formed by a resin having adhesiveness at room temperature, and is formed by, for example, an acrylic resin or a rubber-based resin.

As illustrated in FIG. 2 and FIG. 4, adhesion regions 42 and 43 and a non-adhesion region 44 are disposed in a striped manner in each of the tapes 40 and 41. Specifically, each of the tapes 40 and 41 includes adhesion regions 42 and 43 as two rectangular regions disposed on both end portions in the winding direction, and a non-adhesion region 44 as a rectangular region sandwiched between the two adhesion regions 42 and 43. FIG. 4 illustrates such adhesion regions 42 and 43 by dot areas, and such a non-adhesion region 44 by a plain portion. The two adhesion regions 42 and 43 each include a substrate layer and an adhesion layer. The non-adhesion region 44 consists only of a substrate layer.

An intermediate portion in the winding direction γ of each of the tapes 40 and 41 extends across the winding finish end E of the negative electrode plate 12, and is attached on a winding finish end portion of the negative electrode plate 12 and a portion located in a winding back direction on the outermost peripheral surface. Such tapes may be each attached at only one position on the intermediate portion in the axial direction α, on the outermost peripheral surface of the electrode group 14, or at three or more positions away from one another in the axial direction α, on the outermost peripheral surface of the electrode group 14. Furthermore, each of the tapes 40 and 41 is attached by substantially one cycle on the outermost peripheral surface of the electrode group 14 in an example illustrated in FIG. 3.

According to the non-aqueous electrolyte secondary battery 10, the tapes 40 and 41 can be inhibited from being fractured according to charge and discharge. Specifically, the present inventor has made intensive studies about the above problem caused in the prior art, and has found that, when an electrode group is expanded according to charge and discharge, a tape is locally stretched in a winding finish end portion of the electrode group and thus the tape is fractured.

In an embodiment, a non-adhesion region 44 sandwiched between two adhesion regions 42 and 43 in each of tapes 40 and 41 is disposed in such a way as to extend across a winding finish end E of a negative electrode plate 12 located on the outermost periphery of an electrode group 14, in a winding direction. Thus, when the electrode group 14 is expanded according to charge and discharge, any tensile stress in a winding direction γ, which each of the tapes 40 and 41 receives from the outermost peripheral surface of the electrode group 14, is dispersed in the entire non-adhesion region 44. Thus, the electrode group 14 is largely expanded, and, even if the amount of stretching of each of the tapes 40 and 41 is increased due to movement of the winding finish end, the amount of stretching is dispersed in the entire non-adhesion region 44, and thus the amount of stretching per unit length of each of the tapes 40 and 41 is small to hardly lead to fracture of each of the tapes 40 and 41.

The non-adhesion region 44 in each of the tapes 40 and 41 is disposed in such a way as to extend across a winding finish end E of the negative electrode plate 12 in the winding direction, the winding finish end E being located on the outermost periphery of the electrode group 14. A negative electrode current collector 35 of the negative electrode plate 12 is exposed on the outermost peripheral surface of the electrode group 14, and the negative electrode current collector 35 is in contact with the inside surface of a cylindrical portion of a case body 15. Thus, stretching of each of the tapes can be increased as described above and thus the amount of expansion of a secondary battery in charge and discharge can be increased, thereby allowing for an increase in contact area between the negative electrode current collector 35 of the negative electrode plate 12 on the outermost periphery and the inside surface of the case body 15 of a battery case. Thus, in a case where the case body 15 is used as a negative electrode terminal as in the present example, an increase in current collection area can be made to result in a reduction in battery resistance.

The negative electrode current collector 35 is exposed on the entire surface of the outermost periphery of the electrode group 14, thereby enabling the contact area between the negative electrode current collector 35 and the inside surface of the case body 15 of a battery case to be more increased, resulting in a more reduction in battery resistance.

The ratio of the length of the non-adhesion region 44 in the circumferential direction to the perimeter (length of one cycle) of the outermost peripheral surface of the electrode group 14, if too low, causes the effect of suppression of tape fracture to be decreased. The ratio of the length of the non-adhesion region 44 in the circumferential direction to the perimeter of the outermost peripheral surface of the electrode group 14 is preferably in the range of 5% or more, further preferably in the range of 20% or more from the viewpoint that the effect of suppression of tape fracture is ensured.

The entire length of such each tape in the circumferential direction in the electrode group 14 is preferably substantially equal to or more than the perimeter (length of one cycle) of the outermost peripheral surface of the electrode group 14 so that both the adhesion regions and the non-adhesion region can ensure sufficient lengths. The length of such each tape in the circumferential direction may be more than the perimeter of the outermost peripheral surface of the electrode group 14 as in another example illustrated in FIG. 11 described below, but, if the non-adhesion region and the adhesion regions of such each tape are overlapped, any non-adhesion region in such an overlapped portion is hardly stretched, resulting in a reduction in effect of suppression of tape fracture. Thus, the adhesion regions of such each tape are preferably not overlapped with the non-adhesion region of such each tape.

The width of such each tape in the axial direction α in the electrode group 14, if too small, causes a securement force of such each tape to be decreased, and thus the width relative to the length in the axial direction α of the electrode group 14 is preferably 20% or more. In a case where a secondary battery includes two or more such tapes 40 and 41 as in the present example, the sum of the widths of such a plurality of tapes is preferably 20% or more relative to the length in the axial direction α of the electrode group. A too large width of such each tape inhibits the electrode group 14 from being expanded to thereby cause the electrode group 14 to be hardly in contact and communication with a battery case in a configuration where the negative electrode current collector 35 is disposed on the outermost periphery of the electrode group 14 as in the present example. Thus, the sum of the widths of such tapes is preferably 40% or less relative to the length in the axial direction α of the electrode group 14. In such a case, such tapes are preferably disposed on both ends in the axial direction α of the electrode group 14 in order to achieve both a securing function of the electrode group 14 and a contact between the electrode group 14 and a battery case. The electrode group 14 is more easily expanded in charge and discharge on the intermediate portion in the axial direction than both end portions in the axial direction, and thus such tapes are disposed on both ends in the axial direction α of the electrode group 14 to thereby increase the amount of expansion, thereby allowing the electrode group 14 and a battery case to be easily electrically connected.

EXPERIMENTAL EXAMPLES

The inventor of the present disclosure has produced three secondary batteries in total of Example 1 and Comparative Examples 1 and 2 under conditions shown in Table 1 below, and has performed charge and discharge under predetermined conditions to thereby confirm the presence of the occurrence of fracture of each tape.

TABLE 1

| | Ratio of non-adhesion region | Position of non-adhesion | Presence of tape fracture |
|---|---|---|---|
| Example1 | 65% | Winding finish end of negative electrode plate | No |
| Comparative Example1 | 65% | Continuous portion of negative electrode plate | Yes |
| Comparative Example2 | 0% | — | Yes |

EXAMPLES

Example 1

[Production of Positive Electrode Plate]

A lithium nickel cobalt aluminum composite oxide represented by $LiNi_{0.88}Co_{0.09}Al_{0.03}O_2$ was used as a positive electrode active material. Thereafter, 100 parts by weight of $LiNi_{0.88}Co_{0.09}Al_{0.03}O_2$, 1 part by weight of acetylene black and 1 part by weight of polyvinylidene fluoride (PVDF) (binder) were mixed, and a proper amount of N-methyl-2-pyrrolidone (NMP) was added thereto to prepare a positive electrode mixture slurry. Next, both surfaces of an elongated positive electrode current collector made of aluminum foil were coated with such a paste-like positive electrode mixture slurry, and the resultant was dried by a drier and thereafter cut to a predetermined electrode size and rolled by using a roller, thereby producing a positive electrode plate 11 where a positive electrode active material layer was formed on each of both surfaces of the positive electrode current collector. The crystal structure of $LiNi_{0.88}Co_{0.09}Al_{0.03}O_2$ was a layered rock salt structure (hexagonal crystal, space group: R3-m). A plain portion where no active material was formed was formed on the center portion in the length direction of the positive electrode plate, and a positive electrode lead of aluminum was secured to the plain portion according to ultrasonic welding.

[Production of Negative Electrode Plate]

A mixed product of 95 parts by weight of a graphite powder and 5 parts by weight of silicon oxide was used as a negative electrode active material. One hundred parts by weight of the negative electrode active material, 1 part by weight of styrene-butadiene rubber (SBR) as a binder and 1 part by weight of carboxymethylcellulose (CMC) as a thickener were mixed. Such a mixed product was dispersed in water to thereby prepare a negative electrode mixture slurry. Both surfaces of a negative electrode current collector made of copper foil were coated with the negative electrode mixture slurry, and the resultant was dried by a drier and compressed by a roller of a roll press machine so that a predetermined thickness was achieved. After an elongated negative electrode current collector where a negative electrode active material layer was formed was cut to a predetermined electrode size, a negative electrode lead made of nickel was mounted thereto. A plain portion where no active material was formed on both surfaces was here formed on one end portion of the negative electrode current collector, and the negative electrode lead was secured to the plain portion according to ultrasonic welding. A plain region as a plain portion where no active material was formed on both surfaces and a single-sided active material region as a single-sided coating portion where an active material was formed on only one surface continuously to the plain region were formed on other end portion of the negative electrode current collector. Thus, a negative electrode plate 12 was produced.

[Production of Electrode Group]

The positive electrode plate 11 and the negative electrode plate 12 produced were spirally wound with a separator 13 interposed therebetween, thereby producing a wound-type electrode group. The negative electrode plate 12 was here wound such that an end portion where the negative electrode lead was formed was located closer to the inner periphery (start of winding), an end portion where the single-sided active material region was formed was located on the outer periphery (stop of winding) and a surface of the single-sided active material region, coated with the active material, was an inside surface. The separator 13 here used was one where a heat-resistant layer with polyamide and an alumina filler dispersed was formed on one surface of a microporous film made of polyethylene.

[Securement of Electrode Group]

Tapes 40 and 41 where a polypropylene film having a thickness of 12 μm was coated with an acrylic adhesive at 5 μm in a striped manner were cut out as illustrated in FIG. 4. The respective tapes were attached on both end portions in the axial direction of the electrode group produced as above, along with the winding direction, thereby securing the electrode group. The tapes 40 and 41 were here attached on the electrode group such that a non-adhesion region 44 on the center portion of each of the tapes 40 and 41 was disposed at a position extending across a winding finish end E of the negative electrode plate 12 in the winding direction, as illustrated in FIG. 2 and FIG. 3.

[Preparation of Non-Aqueous Electrolytic Solution]

A non-aqueous electrolytic solution was prepared by adding $LiPF_6$ at 1 mol/L to a mixed solvent where ethylene carbonate (EC), ethyl methyl carbonate (EMC) and diethyl carbonate (DEC) were mixed so that a volume ratio of EC:EMC:DMC of 3:3:4 was achieved.

[Production of Secondary Battery]

The electrode group was housed in a bottomed circular cylindrical case body 15 having an outer diameter of 21 mm and a height of 70 mm, insulating plates 17 and 18 were disposed above and below the electrode group, respectively, and the non-aqueous electrolytic solution was injected into the case body 15. Thereafter, an opening end portion of the case body 15 was sealed by a gasket 27 and a sealing assembly 16, thereby producing a 21700-type cylindrical non-aqueous electrolyte secondary battery.

The ratio of the length of the non-adhesion region 44 in the circumferential direction to the perimeter (length of one cycle) of the outermost peripheral surface of the electrode group 14 was 65% in Example 1, as shown in the column "Ratio of non-adhesion region" in Table 1.

Comparative Example 1

Figure 5:
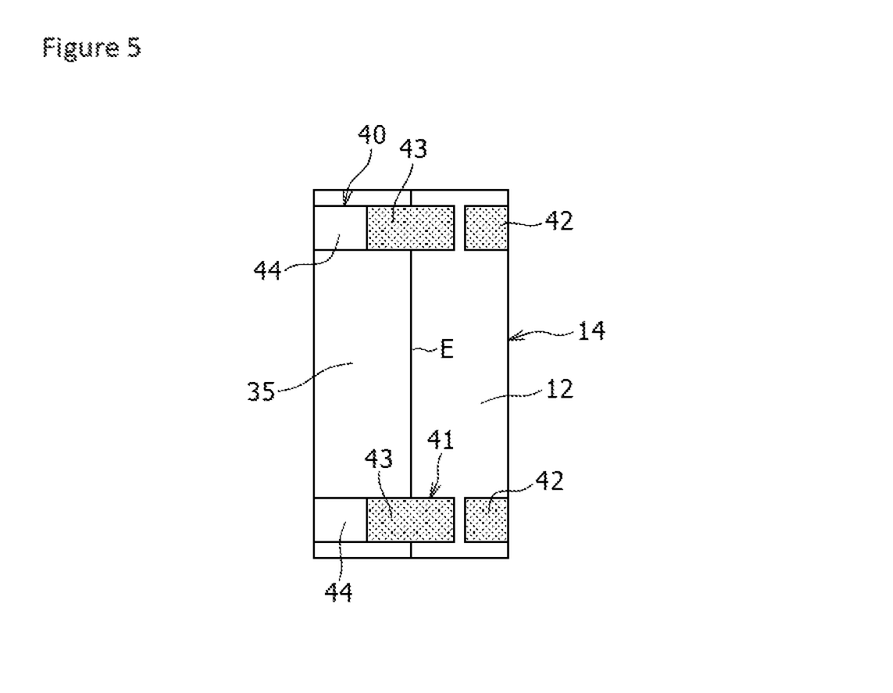
FIG. 5 is a view of an electrode group in Comparative Example 1, when viewed from the outer periphery.
Figure 6:
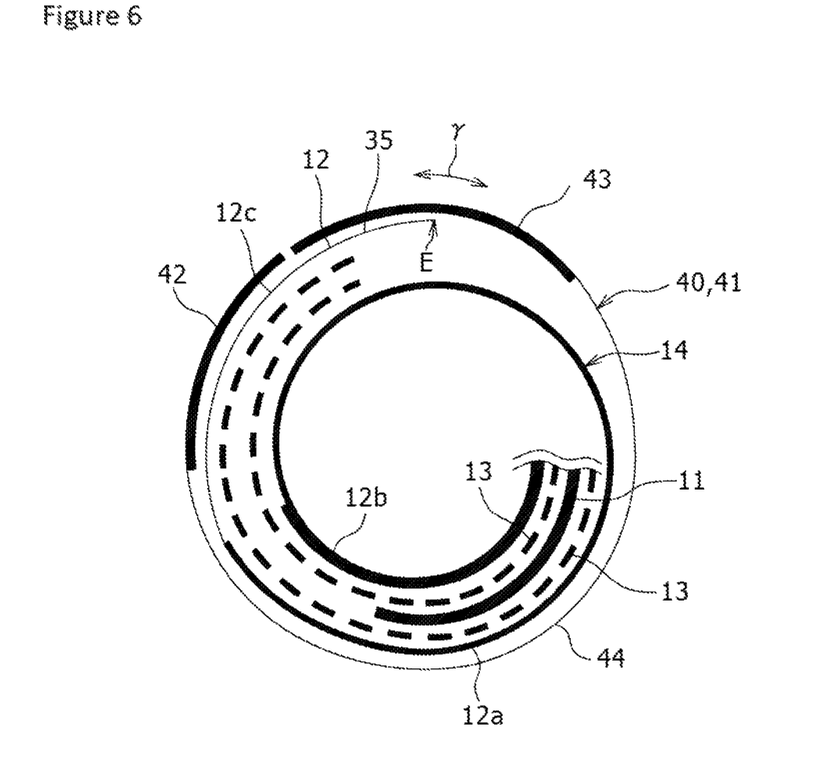
FIG. 6 is a sectional view perpendicular to an axial direction, of the outer periphery portion of the electrode group in Comparative Example 1.

FIG. 5 is a view of an electrode group 14 in Comparative Example 1, when viewed from the outer periphery. FIG. 6 is a sectional view of a case of cutting of the outer periphery portion in the electrode group 14 in Comparative Example 1 at a flat surface perpendicular to the axial direction. As shown in Table 1 and illustrated in FIG. 5 and FIG. 6, the position of a non-adhesion region 44 of each of tapes 40 and 41 in Comparative Example 1 corresponded to "Continuous portion of negative electrode plate" as a portion in a winding direction γ, away from a winding finish end E of a negative electrode plate 12 on the outermost peripheral surface of the electrode group 14. Respective adhesion regions 43 on one ends of the tapes 40 and 41 were disposed in such a way as to extend across the winding finish end E in the winding direction γ. Any configuration other than the above in Comparative Example 1 was the same as in Example 1.

Comparative Example 2

Figure 7:
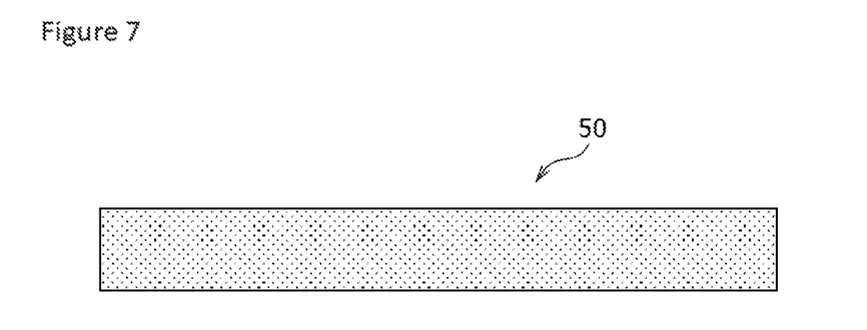
FIG. 7 is a view illustrating a spread state of a tape in Comparative Example 2.

FIG. 7 is a view illustrating a spread state of a tape 50 in Comparative Example 2. As shown in Table 1 and illustrated in FIG. 7, the entire region in the circumferential direction of the tape 50 in Comparative Example 2 corresponded to an adhesion region illustrated by a sandy portion in FIG. 7, and the tape 50 was attached on the outermost peripheral surface of the electrode group 14. Any configuration other than the above in Comparative Example 2 was the same as in Example 1.

[Test Method]

Each of the non-aqueous electrolyte secondary batteries in Example 1 and Comparative Examples 1 and 2 was used to perform the initial charge by performing constant current charge at a current of 940 mA until the battery voltage reached 4.2 V and thereafter performing constant voltage charge at a battery voltage of 4.2 V until the current value reached 240 mA. Furthermore, the initial discharge was then performed by performing constant current discharge at a current of 940 mA until the battery voltage reached 2.5 V. After such initial charge and discharge was performed, the battery was disassembled, and each tape was observed to thereby confirm the presence of fracture of such a tape. The results with respect to the presence of fracture of each tape were shown in the column "Presence of tape fracture" in Table 1.

[Test Results]

As shown in Table 1, no tape fracture occurred in Example 1. On the other hand, the tape was fractured on a portion located on the winding finish end portion of the negative electrode plate 12 in Comparative Example 2. The tape in Comparative Example 1, although had a non-adhesion region at the same ratio as in Example 1, was fractured. It could be confirmed from such test results that tape fracture could be suppressed by disposing the non-adhesion region 44 on the winding finish end portion of the negative electrode plate 12 as in Example 1.

Figure 8:
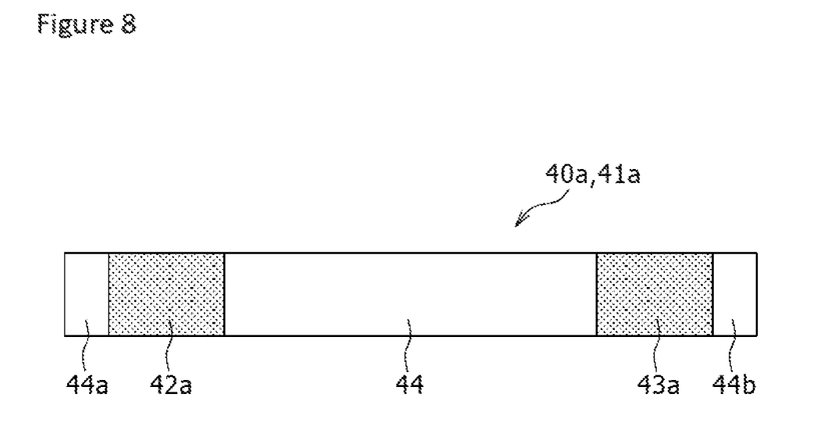
FIG. 8 is a view illustrating a spread state of a tape constituting a non-aqueous electrolyte secondary battery of another example of an embodiment.

FIG. 8 is a view illustrating a spread state of each of tapes 40a and 41a constituting a non-aqueous electrolyte secondary battery of another example of an embodiment. In the case of the present example, two non-adhesion regions 44a and 44b were disposed on both ends of each of the tapes 40a and 41a, the ends being located outward of two adhesion regions 42a and 43a, respectively, unlike the case of the configuration illustrated in FIG. 4. Thus, a configuration could be adopted where the non-adhesion regions 44a and 44b serving as one portion of the non-adhesion regions 44, 44a and 44b were located closer to respective ends of the tapes 40a and 41a than the adhesion regions 42a and 43a. In the present example, other configuration and action were the same as in each configuration of FIG. 1 to FIG. 4.

Figure 9:
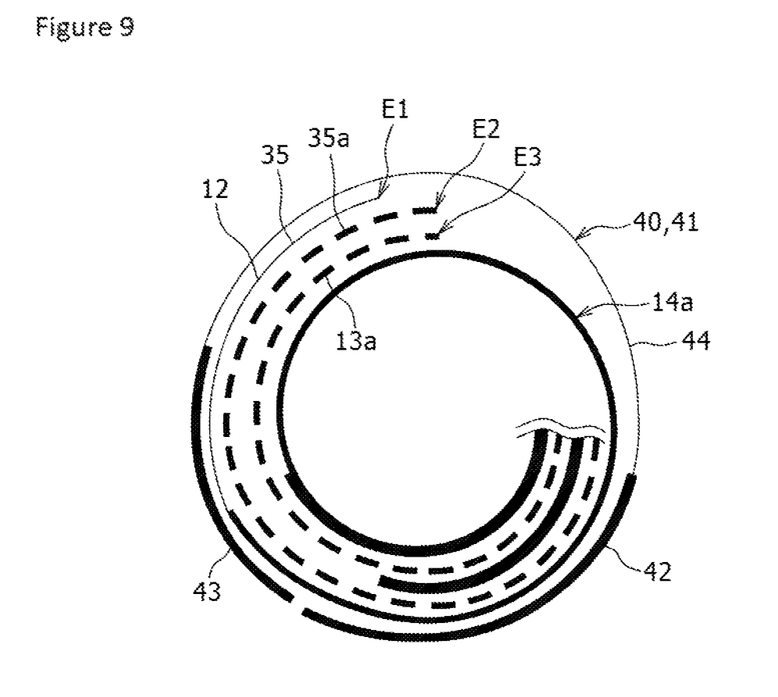
FIG. 9 is a sectional view perpendicular to an axial direction, of the outer periphery portion of an electrode group in another example of an embodiment.

FIG. 9 is a sectional view perpendicular to an axial direction, of the outer periphery portion of an electrode group 14a in another example of an embodiment. In the case of the present example, the outermost periphery portions of two separators 13a were more protruded in the winding direction than a winding finish end E1 of a negative electrode plate 12 located on the outermost periphery of the electrode group 14a, unlike the case of the configuration illustrated in FIG. 3. A non-adhesion region 44 of each of the tapes 40 and 41 was disposed in such a way as to extend across the winding finish end E1 of the negative electrode plate 12 and winding finish ends E2 and E3 of two separators 13a, in the winding direction. In the present example, other configuration and action were the same as in each configuration of FIG. 1 to FIG. 4.

Figure 10:
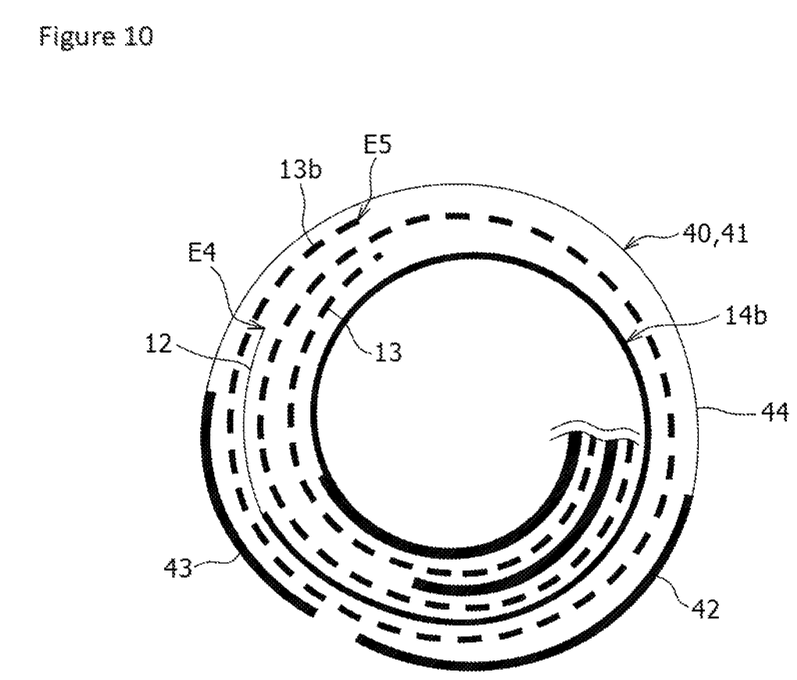
FIG. 10 is a sectional view perpendicular to an axial direction, of the outer periphery portion of an electrode group in another example of an embodiment.

FIG. 10 is a sectional view perpendicular to an axial direction, of the outer periphery portion of an electrode group 14b in another example of an embodiment. In the case of the present example, a winding stop end portion of a separator 13b on the outermost periphery was more stretched in the winding direction than a winding finish end E4 of a negative electrode plate 12 on the outermost periphery, by one cycle or more, to thereby allow the separator 13b to be disposed on the entire surface of the outermost periphery of the electrode group 14b, unlike the case of the configuration illustrated in FIG. 3. Thus, while the effect of contact and communication of the negative electrode plate 12 with the inside surface of a case body in expansion of the electrode group 14b was not obtained unlike the cases of the configurations of FIG. 1 to FIG. 4, stretching of a tape could be increased and thus charge and discharge could be inhibited from being limited.

Furthermore, each of tapes 40 and 41 was attached on the outermost peripheral surface of the separator 13b so as to secure a winding finish end E5 of the separator 13b on the outermost periphery to the separator 13b located on the outermost peripheral surface of the electrode group 14b. A non-adhesion region 44 of each of the tapes 40 and 41 was disposed in such a way as to extend across the winding finish end E5 of the separator 13b located on the outermost periphery of the electrode group 14b, in the winding direction. In the present example, other configuration and action were the same as in each configuration of FIG. 1 to FIG. 4.

Although the illustration was omitted, a positive electrode plate could be disposed on the entire surface of the outermost peripheral surface of the electrode group and such each tape could be attached on the outermost peripheral surface of the positive electrode plate so as to secure a winding finish end of the positive electrode plate on the outermost periphery. The non-adhesion region of such each tape was here disposed in such a way as to extend across the winding finish end of the positive electrode plate located on the outermost periphery of the electrode group, in the winding direction.

Figure 11:
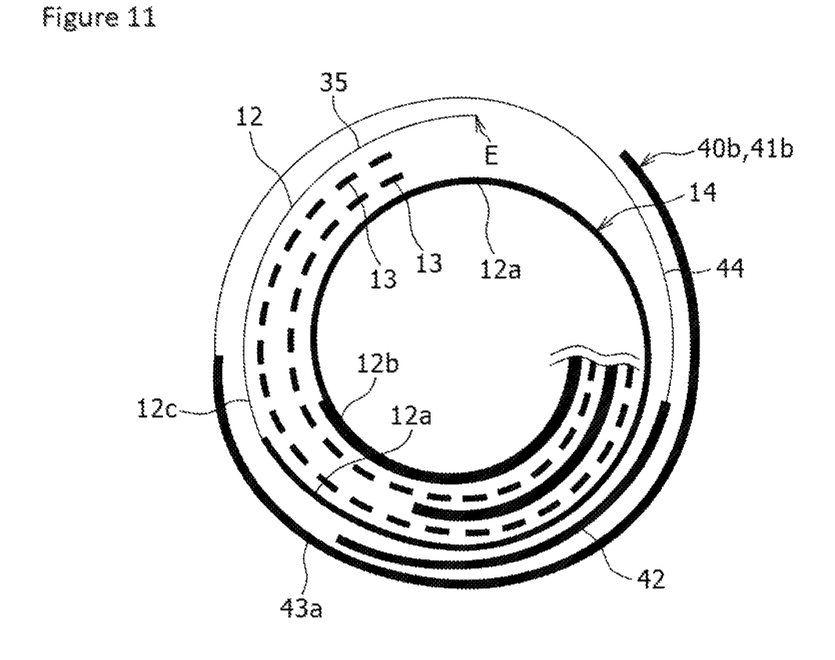
FIG. 11 is a sectional view perpendicular to an axial direction, of the outer periphery portion of an electrode group in another example of an embodiment.

FIG. 11 is a sectional view perpendicular to an axial direction, of the outer periphery portion of an electrode group 14 in another example of an embodiment. In the case of the present example, the length of an adhesion region 43a at one end in the circumferential direction, of each of tapes 40b and 41b, was larger than the case of the configuration illustrated in FIG. 3, and the length of each of the tapes 40b and 41b was larger than the length of one cycle on the outermost peripheral surface of the electrode group 14. The adhesion region 43a at one end in the circumferential direction, of each of the tapes 40b and 41b, with which an outside on other end portion in the circumferential direction, of each of the tapes 40b and 41b, was covered, was attached on such other end portion, and an outer side surface of a negative electrode plate 12 on the outermost periphery. A non-adhesion region 44 of each of the tapes 40b and 41b was disposed in such a way as to extend across a winding finish end E of the negative electrode plate 12 located on the outermost periphery of the electrode group 14, in the winding direction. In the present example, other configuration and action were the same as in each configuration of FIG. 1 to FIG. 4.

The effects in the embodiments and Examples are considered not to depend any positive electrode plate material, negative electrode plate material and separator material, and any configuration, which has a wound-type electrode group where a tape is attached on a winding finish end, is considered to be able to similarly exert the effects.

REFERENCE SIGNS LIST 10 non-aqueous electrolyte secondary battery, 11 positive electrode plate, 12 negative electrode plate, 12a single-sided active material region, 12b two-sided active material region, 12c plain region, 13, 13a separator, 14, 14a electrode group, 15 case body, 16 sealing assembly, 17, 18 insulating plate, 19 positive electrode lead, 21 projecting portion, 22 filter, 23 lower vent member, 24 insulating member, 25 upper vent member, 26 cap, 27 gasket, 28 space, 29 winding center axis, 35 negative electrode current collector, 40, 40a, 40b, 41, 41a, 41b tape, 42, 42a, 43, 43a adhesion region, 44 non-adhesion region, 50 tape.

The invention claimed is:

1. A non-aqueous electrolyte secondary battery, comprising:
 a bottomed cylindrical case body having an opening;
 an electrode group which is housed in the case body and in which a positive electrode plate and a negative electrode plate are wound with a separator interposed therebetween; and
 a tape attached on an outermost peripheral surface at both end portions in an axial direction of the electrode group such that a winding finish end of the electrode group is secured to the outermost peripheral surface of the electrode group; wherein
 the tape has two adhesion regions each including a substrate layer and an adhesion layer, and a non-adhesion region which is sandwiched between the two adhesion regions and which consists only of a substrate layer,
 the two adhesion regions and the non-adhesion region are arranged along a winding direction,
 the non-adhesion region is disposed in such a way as to extend across a winding finish end of the negative electrode plate located on an outermost periphery of the electrode group, in the winding direction, and
 a current collector of the negative electrode plate is exposed on the outermost peripheral surface of the electrode group, and the current collector is in contact with the case body.

2. The non-aqueous electrolyte secondary battery according to claim 1, wherein
 the current collector of the negative electrode plate is exposed on an entire surface of an outermost periphery of the electrode group.

* * * * *